(12) United States Patent
Shehata et al.

(10) Patent No.: US 7,933,469 B2
(45) Date of Patent: Apr. 26, 2011

(54) VIDEO PROCESSING

(75) Inventors: Shereef Shehata, Allen, TX (US);
Weider Peter Chang, Hurst, TX (US)

(73) Assignee: Texas Instruments Incorporated,
Dallas, TX (US)

( * ) Notice: Subject to any disclaimer, the term of this patent is extended or adjusted under 35 U.S.C. 154(b) by 910 days.

(21) Appl. No.: 11/846,201

(22) Filed: Aug. 28, 2007

(65) Prior Publication Data

US 2008/0056605 A1    Mar. 6, 2008

Related U.S. Application Data

(60) Provisional application No. 60/824,348, filed on Sep. 1, 2006.

(51) Int. Cl.
*G06K 9/40* (2006.01)

(52) U.S. Cl. ......... 382/274; 382/260; 382/275; 382/278

(58) Field of Classification Search .................. 382/260, 382/274, 275, 278
See application file for complete search history.

(56) References Cited

U.S. PATENT DOCUMENTS

| | | | | |
|---|---|---|---|---|
| 6,839,092 | B2 * | 1/2005 | Renner | 348/505 |
| 7,023,918 | B2 * | 4/2006 | Yu et al. | 375/240.12 |
| 7,075,993 | B2 * | 7/2006 | O'Brien, Jr. | 375/240.27 |
| 7,088,777 | B2 * | 8/2006 | Yu et al. | 375/240.28 |
| 7,263,218 | B2 * | 8/2007 | Altenhof-Long et al. | 382/162 |
| 7,366,346 | B2 * | 4/2008 | Newman et al. | 382/162 |
| 7,397,588 | B2 * | 7/2008 | Sloan et al. | 358/520 |
| 7,403,205 | B2 * | 7/2008 | Zeng | 345/590 |
| 7,414,631 | B2 * | 8/2008 | Tin | 345/590 |
| 7,425,981 | B2 * | 9/2008 | Kamariotis | 348/14.13 |

* cited by examiner

*Primary Examiner* — Yosef Kassa (74) *Attorney, Agent, or Firm* — Mirna Abyad; Wade J. Brady, III; Frederick J. Telecky, Jr.

(57) ABSTRACT

Digital video contrast enhancement and skin tone correction by conversion to CIECAM02 color space with lightness transformation and a skin tone probability density function of hue and saturation.

3 Claims, 9 Drawing Sheets

VIDEO PROCESSING

CROSS-REFERENCE TO RELATED APPLICATIONS

This application claims priority from and incorporates by reference provisional patent application Nos. 60/824,330 and 60/824,348, both filed Sep. 1, 2006. The following copending co-assigned patent applications disclose related subject matter: application Ser. Nos. 11/741,753, 11/849,807, 11/846, 021 11/846,038, 11/849,456.

BACKGROUND OF THE INVENTION

The present invention relates to digital signal processing, and more particularly to architectures and methods for digital color video processing.

Imaging and video capabilities have become the trend in consumer electronics. Digital cameras, digital camcorders, and video-capable cellular phones are common, and many other new gadgets are evolving in the marketplace. Advances in large resolution CCD/CMOS sensors, LCD displays, and high bandwidth wireless communication coupled with the availability of low-power digital signal processors (DSPs) has led to the development of portable digital devices with both high resolution imaging and display capabilities. Indeed, various cellphone models can display digital television signals. And digital television allows for more accurate color processing than with traditional analog video, and thus capabilities such as contrast enhancement to provide the high contrast images that are appealing to human eyes. Many contrast enhancement methods have been proposed for image processing applications; but they are either too complex to be used for consumer video or still cameras, or specific for different imaging applications such as biomedical imaging.

Furthermore, digital televisions have to support traditional television systems, such as NTSC and PAL. NTSC video systems are particularly susceptible to flesh tone (skin tone, skin color) errors, because the color subcarrier in NTSC may have phase errors that cause these errors. Some tint on the flesh color due to the actual display processing requires correction, as the human eye is sensitive to flesh tones as one of the important memory colors.

CIECAM02 is a color appearance model put out by the CIE. Moroney et al., "The CIECAM02 Color Appearance Model", IS&T/SID Tenth Color Imagining Conference, p 23 (2002) describes the conversion from usual color components (i.e., tristimulus pixel values) to the perceptual attribute correlates J, h, s of the CIECAM02 model. The model takes into account the viewing conditions to compute pixel J,h,s values.

SUMMARY OF THE INVENTION

The present invention provides contrast enhancement and/or color correction for digital color video with low complexity by processing in the CIECAM02 color space.

DESCRIPTION OF THE PREFERRED EMBODIMENTS

1. Overview

Preferred embodiment methods for color video contrast enhancement (global and local) and/or flesh tone (skin tone) correction first convert images or pictures (frames/fields) into the CIECAM02 color space and then transform pixel lightness (J) for contrast enhancement and use hue (h) and saturation (s) to compute skin tone probability and correction. The skin tone probability can also be used to inhibit the contrast enhancement. FIGS. 1A-1D are block diagrams.

Preferred embodiment systems (cellphones with digital television display capability, PDAs, etc.) perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators. FIG. 1E is an example of digital TV processing hardware. A stored program in an onboard or external (flash EEP)ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet.

2. Processing in CIECAM02 Color Space

Figure 1A:
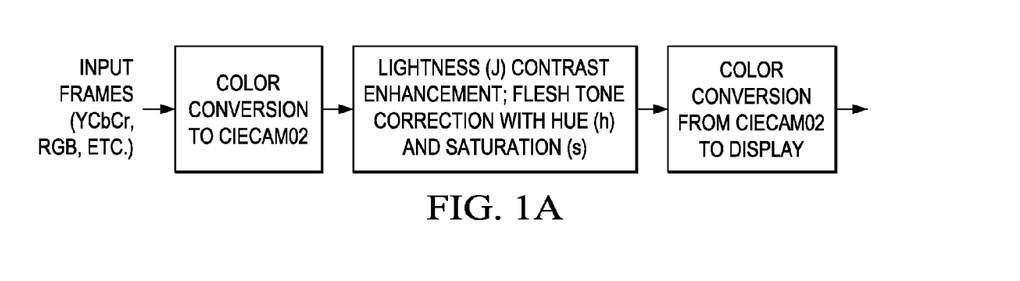
FIGS. 1A-1E show preferred embodiment system components.

As illustrated in FIG. 1A, preferred embodiment methods perform contrast enhancement and/or flesh tone (skin tone) color correction for color images (video or stills) after conversion to the CIECAM02 color space. Traditional video color spaces, such as YCbCr, do not allow for the independent control of the image luminance. The CIECAM02 color space presents an alternative where the J channel (lightness) of the color space has much less interdependence with the hue (h) and saturation (s) channels.

Preferred embodiment contrast enhancement methods have mapping functions for an image represented in the CIECAM02 color space, and the mapping could be a generic transformation that uses simple hardware-efficient linear interpolation methods to compute a dynamic contrast transformation for each video image, or a more elaborate transform such as a cubic hermitian transform function that guarantees the smoothness of the transfer function through the equality of slope at the interpolation pivotal points. Also, the preferred embodiments provide selectable White Level Expansion/Black Level Expansion processing as special cases of the method based on the average brightness of the frame.

Preferred embodiment contrast enhancement methods further provide an option to use information about the statistics of the current pixel color in the computation of the lightness (luminance) transfer function. Based on the probability of how close the hue and saturation of the current pixel are to those of flesh tones (skin tones), the preferred embodiment methods can inhibit (or modify) the lightness (J) contrast transformation for a pixel. This achieves a more natural look than if these pixels are left subject to large variations in the lightness due to contrast enhancement. And the skin tone probability can also be used to correct pixel colors which are likely to be skin tones, such as by hue transformation.

Conversion of an image from a standard television color representation (e.g., YCbCr pixel values) to the tristimulus representation (XYZ pixel values) is well known; and conversion from tristimulus representation (XYZ) to CIECAM02 color space representation (including lightness J, hue h, and saturation s) is prescribed by the CIECAM02 model. In particular, the CIECAM02 model first requires input of viewing conditions (the surround selected from "average", "dim", and "dark"; the luminance of the adapting field; the luminance factor of the background ($Y_b/Y_w$, where $Y_b$ is the background luminance and $Y_w$ is the white point luminance); and the white point red $R_w$, green $G_w$, and blue $B_w$) to compute constants used in the transformations. Then for each pixel color the transformations proceed as follows: the tristimulus XYZ are linearly transformed to modified Li RGB by matrix $M_{CAT02}$, the RGB are transformed to the chromatic adapted $R_C$, $G_C$, $B_C$ using the degree of adaptation and the white point luminance and colors; the chromatic adapted $R_C$, $G_C$, $B_C$ are linearly transformed to Haut-Pointer-Estevez space R'G'B' by matrix multiplication with $M_H$ and $M_{CAT02}^{-1}$; the R'G'B' are transformed by a non-linear response compression to $R_a'G_a'B_a'$; preliminary Cartesian coordinates and magnitude (a, b, t) are computed from the $R_a'G_a'B_a'$, compute the hue h=arc tan(b/a) expressed in degrees (note that red, yellow, green, and blue are at about h=20, 90, 164, and 238, respectively); the achromatic response A is computed as a linear combination of the $R_a'G_a'B_a'$; compute the lightness $J=100(A/A_w)^{cz}$ where $A_w$ is the achromatic response for the white point and c and z are viewing condition constants; compute brightness Q from A, J, and viewing constants; compute chroma C from J and t; compute the colorfullness M from C and a viewing constant; and lastly, compute saturation $s=100\,(M/Q)^{1/2}$.

The computations could be implemented as described in cross-referenced copending patent application Ser. Nos. 11/849,807, 11/849,456.

3. Contrast Enhancement and Flesh Tone (Skin Tone) Correction

Figure 1B:
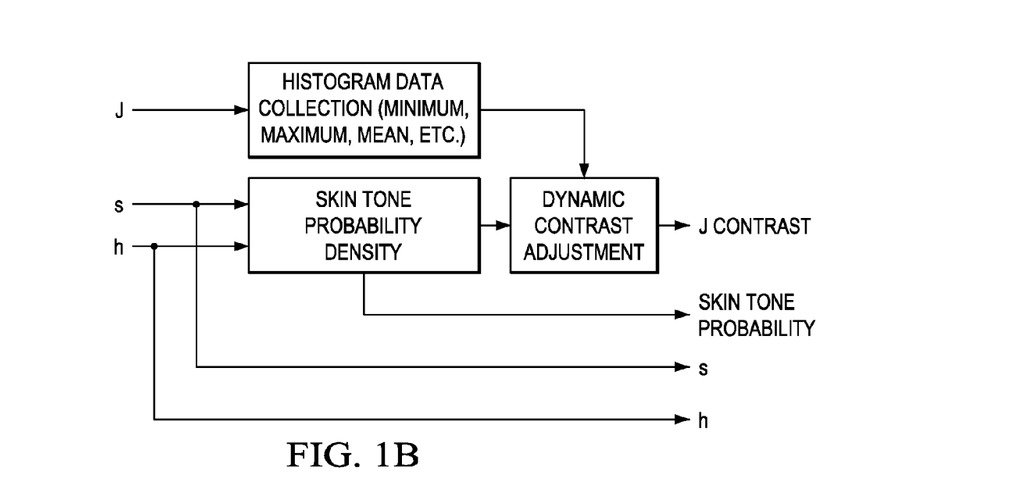
Figure 1C:
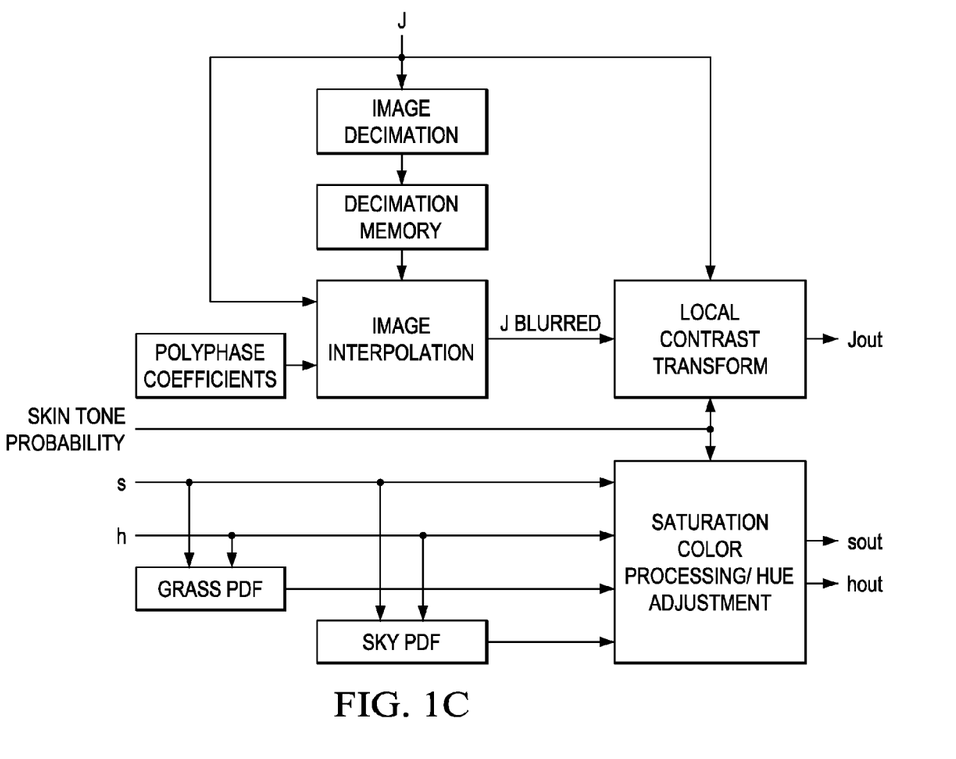

FIGS. 1B-1C show functional blocks with input J, h, and s pixel values for an image (video frame); the global contrast enhancement, local contrast enhancement, and skin tone probability blocks provide pixelwise processing. Also in FIG. 1C the probabilities of special colors grass, sky, and skin tone are computed and used to correct color.

Global contrast enhancement transforms input J values into output J values. Skin tone analysis provides a probability measure that the pixel color is a skin tone, and this probability can be used to modify (i.e., inhibit) the contrast enhancement and to correction the color by hue transformation using the curve illustrated in FIG. 4.

The histogram collection block of FIG. 1B collects lightness (J) statistics of each frame and derives parameters about the current frame, such as the distribution of lightness and the mean lightness of the frame. This data is used to compute the parameters needed for either cubic hermitian interpolation or linear interpolation for the global contrast transformation function for each frame. During display of digital TV images, the vertical blanking provides time for updating the computed parameters in hardware registers to be ready for the next frame interpolations.

The preferred embodiment dynamic contrast enhancement performs the actual lightness transformation based on the parameters computed and outputs the modified lightness values. The following sections 4-6 provide details of global and local contrast enhancement methods.

Based on the probability of how close the hue (h) and saturation (s) of the current pixel are to those of skin tones, the preferred embodiments can prevent pixels with high probability of being skin tones from having large changes in their lightness; see following section 7 for the preferred embodiment skin tone probability density description.

4. Global Dynamic Contrast Enhancement

Preferred embodiment methods of contrast enhancement for an image (e.g., a frame in a video sequence) first convert the image to the CIECAM02 color space, and then for each pixel in the image compute an output value of J (lightness) as a function of the input value of J. That is, if the pixel at (m,n) has input CIECAM02 color components J(m,n), h(m,n), and s(m,n), then the contrast-enhanced output color components are T(J(m,n)), h(m,n), and s(m,n) where T is a non-decreasing function of a general sigmoid shape as variously illustrated in FIGS. 2A-2D. Also as shown in FIG. 1B, a probability of pixel (m,n) color being a skin tone is computed using h(m,n) and s(m,n) in the skin tone pdf block. If this probability is greater than a threshold, then, optionally, the contrast transformation T(J(m,n)) is ignored and the input J(m,n) value is used as the output J(m,n) value. Section 7 describes a preferred embodiment skin tone probability computation.

Two particular preferred embodiments are: T(.) is a cubic hermitian interpolation to achieve a smooth lightness transfer function or T(.) is a hardware-efficient linear interpolation method. In either case the methods find T(.) as follows for an N×M frame with pixel locations (m,n) for $0 \leq m \leq M$, $0 \leq n \leq N$.

(a) Find the minimum, maximum, and mean values of J(m,n) for pixels in the frame; denote these as $J_{min}$, $J_{max}$, and $J_{mean}$, respectively. Note that J(m,n) could be 8-bit data, so the values J(m,n) would lie in the range of 0 to 255 for integer format; or J(m,n) could be 13-bit data with two bits for fractions (i.e., <11.2> format), so the values of J(m,n) would lie in the range 0 to 2047.75. The division used in computing $J_{mean}$ is rounded according to the data format, $$J_{min} = \min(m,n)\{J(m,n)\}$$

$$J_{max} = \max(m,n)\{J(m,n)\}$$

$$J_{mean} = (1/NM) \sum_{m,n} J(m, n)$$

(b) Set the transform values to preserve these three points: $T(J_{min})=J_{min}$, $T(J_{max})=J_{max}$, $T(J_{mean})=J_{mean}$. That is, the minimum, maximum, and mean lightness remain the same, but the contrast within brighter and darker areas is enhanced (or suppressed).

(c) Divide the range from $J_{min}$ to $J_{mean}$ (corresponding to darker areas) into four equal-length intervals: $J_{min}$ to J, J1 to J2, J2 to J3, and J3 to $J_{mean}$; thus $J2=(J_{min}+J_{mean})/2$, $J1=(J_{min}+J2)/2$, and $J3=(J2+J_{mean})/2$. Set the values of T for the interval endpoints as: $T(J2)=J2+(J_{mean}-J_{min})/4$, $T(J1)=J1+3(J_{mean}-J_{min})/16$, and $T(J3)=J3+3(J_{mean}-J_{min})/16$.

(d) Divide the range from $J_{mean}$ to $J_{max}$ (corresponding to brighter areas) into four equal intervals: $J_{mean}$ to J5, J5 to J6, J6 to J7, and J7 to $J_{max}$; thus $J6=(J_{max}+J_{mean})/2$, $J5=(J_{mean}+J6)/2$, and $J7=(J6+J_{max})/2$. Set the values of T for the interval endpoints as: $T(J6)=J6-(J_{max}-J_{mean})/4$, $T(J5)=J5-3(J_{max}-J_{mean})/16$, and $T(J7)=J7-3(J_{max}-J_{mean})/16$.

(e) Compute T(J(m,n)) by finding which one of the eight ranges contains J(m,n) and applying interpolation in that range, so the tentative output for the pixel at (m,n) is T(J(m,n)) along with the input h(m,n) and s(m,n).

Figure 2A:
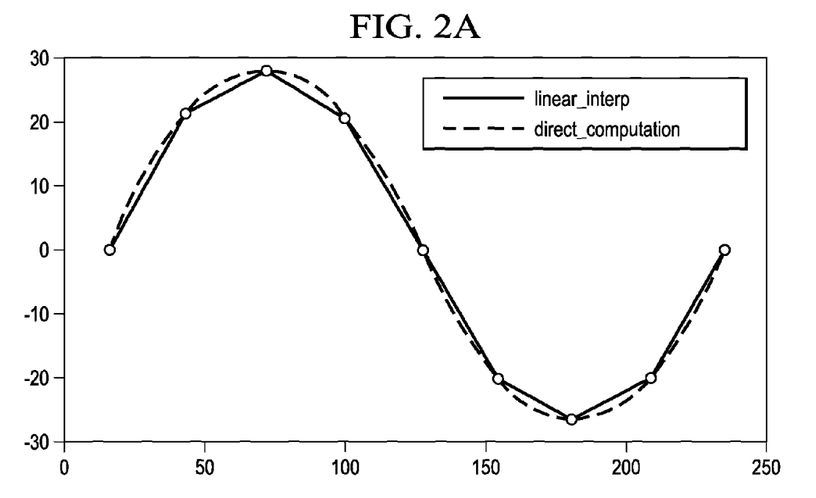
FIGS. 2A-2D illustrate interpolations.
Figure 2B:
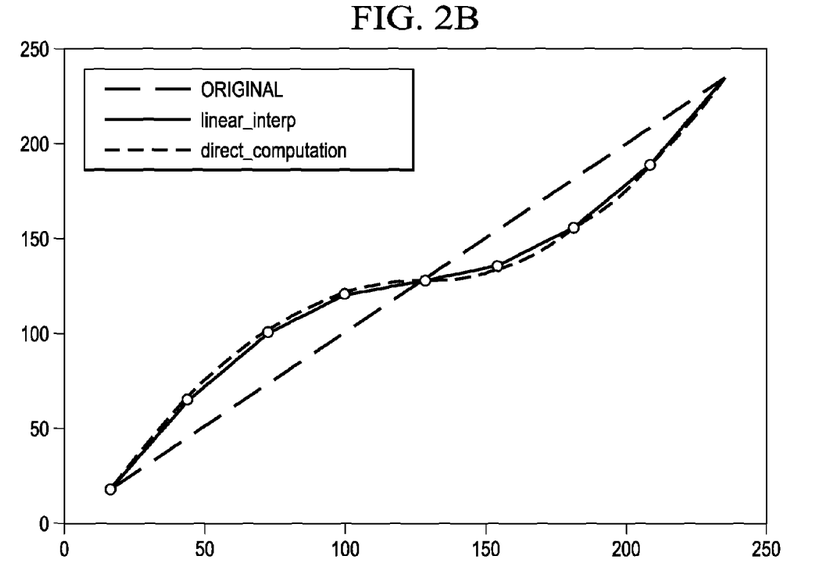

FIGS. 2A-2B illustrate the preferred embodiment linear interpolation and hermitian cubic interpolation for the example of 8-bit data (J in range 0 to 255) with $J_{min}=17$, $J_{max}=240$, and $J_{mean}=128$. In particular, FIG. 2B shows the two T(.) curves, and FIG. 2A shows the two differences from no contrast change: $T_{diff}(J)=T(J)-J$. More explicitly, the two interpolations are as follows:

(A) Linear Interpolation

Generally, a pair of two consecutive data points $(x_j, y_j)$ and $(x_{j+1}, y_{j+1})$ can be connected by an interpolation line:

$$y=a_j+b_j*(x-x_j)$$

where $a_j=y_j$ $b_j=(y_{j+1}-y_j)/(x_{j+1}-x_j)$ (slope of line)

For the preferred embodiments have eight interpolation ranges for J with the eight data point pairs as follows: $(J_{min}, J_{min})$ to $(J1, T(J1))$; $(J1, T(J1))$ to $(J2, T(J2))$; $(J2, T(J2))$ to $(J3, T(J3))$; $(J3, T(J3))$ to $(J_{mean}, J_{mean})$; $(J_{mean}, J_{mean})$ to $(J5, T(J5))$; $(J5, T(J5))$ to $(J6, T(J6))$; $(J6, T(J6))$ to $(J7, T(J7))$; and $(J7, T(J7))$ to $(J_{max}, J_{max})$.

(B) Cubic Hermitian Interpolation.

Generally, two consecutive data points $(x_j, y_j)$ and $(x_{j+1}, y_{j+1})$ can be connected by a cubic Hermite polynomial which has specified slopes, $s_j$ and $s_{j+1}$, at $x_j$ and $x_{j+1}$, respectively:

$$y=a_j+b_j*(x-x_j)+c_j*(x-x_j)^2+d_j*(x-x_j)^2*(x-x_{j+1})$$

where $a_j=y_j$ $b_j=s_j$ (slope at $x_j$)

$c_j=(y_{j+1}-y_j)/(x_{j+1}-x_j)-s_j)/(x_{j+1}-x_j)$ $d_j=(s_{j+1}+s_j-2(y_{j+1}-y_j)/(x_{j+1}-x_j))/(x_{j+1}-x_j)^2$

Thus the hermitian cubic interpolation also needs specified slopes at $J_{min}$, J1, J2, . . . , $J_{max}$. The preferred embodiment hermitian cubic interpolation sets the values and slopes for the difference function $T_{diff}(J)=T(J)-J$ as follows and illustrated in FIG. 2A (note that the values are the same as the difference function for linear interpolation):

| point | value | slope |
|---|---|---|
| $J_{min}$ | 0 | +1 |
| J1 | $3(J_{mean} - J_{min})/16$ | +½ |
| J2 | $(J_{mean} - J_{min})/4$ | 0 |
| J3 | $3(J_{mean} - J_{min})/16$ | −½ |
| $J_{mean}$ | 0 | −1 |
| J5 | $-3(J_{max} - J_{mean})/16$ | −½ |
| J6 | $-(J_{max} - J_{mean})/4$ | 0 |
| J7 | $-3(J_{max} - J_{mean})/16$ | ½ |
| $J_{max}$ | 0 | +1 |

Thus for a pixel input J, find which of the eight intervals J lies in (e.g., $J3<J<J_{mean}$), compute $T_{diff}(J)$ from the interpolation parameters for that interval, and output $T(J)=T_{diff}(J)+J$ as the tentative new lightness for the pixel. If the skin tone disabling applies, then $T_{diff}(J)$ is set to 0.

5. White Level Expansion, Black Level Expansion, and Histogram

Figure 2C:
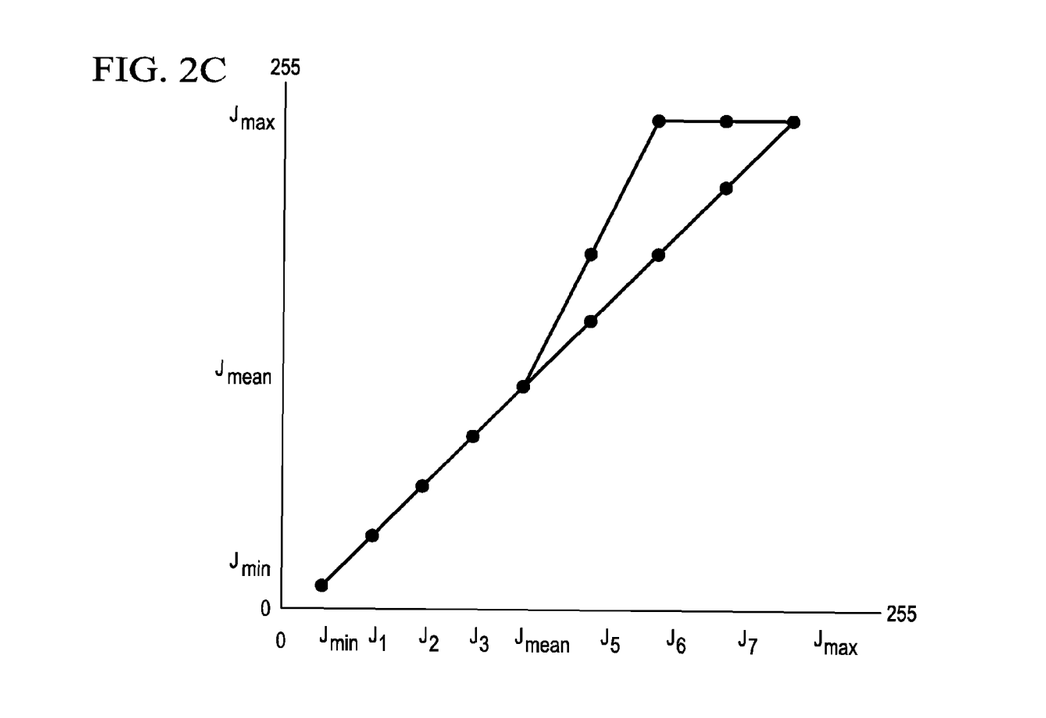
Figure 2D:
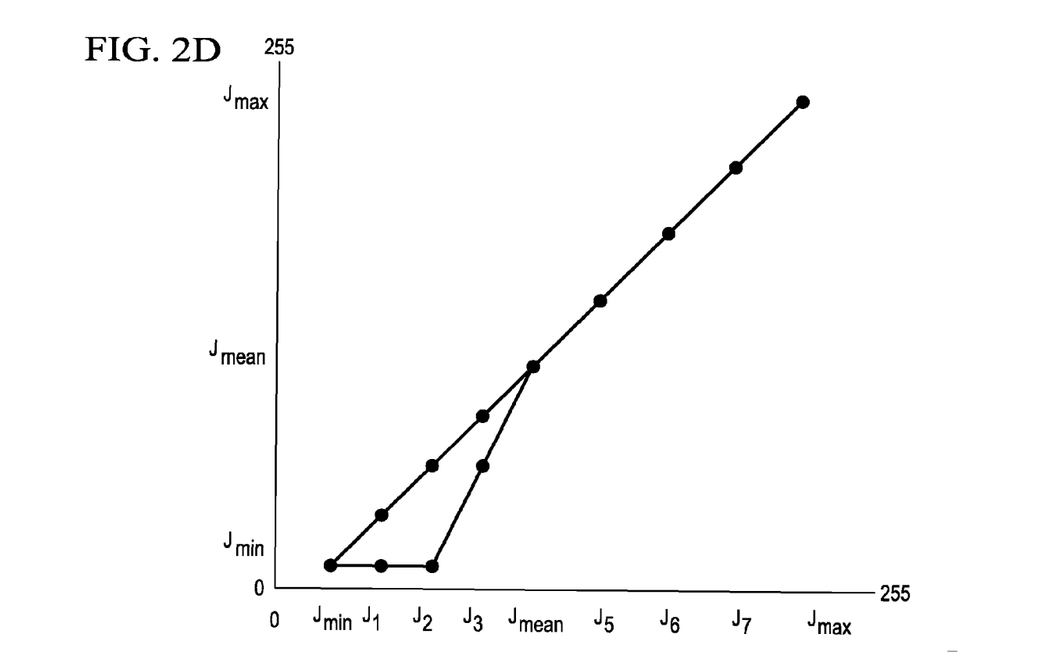

Preferred embodiment linear interpolation contrast enhancement can be modified to provide white level expansion and/or black level expansion. FIG. 2C is the graph of a preferred embodiment transform for white level expansion, and FIG. 2D is the graph of a preferred embodiment transform for black level expansion. In particular, the white level expansion uses the linear interpolation described in section 3 but with a change to simpler fixed values of T for the interval endpoints as: $T(J_{min})=J_{min}$, T(J1) J1, $T(J2)=J2$, $T(J3)=J3$, $T(J_{mean})=J_{mean}$, $T(J5)=(J_{max}+J_{mean})/2$, and $T(J6)=J_{max}$, and $T(J7)=J_{max}$. Or more simply, the white level expansion is implemented by taking the difference function $T_{diff}(J)$ values as follows:

| point | value |
|---|---|
| $J_{min}$ | 0 |
| J1 | 0 |
| J2 | 0 |
| J3 | 0 |
| $J_{mean}$ | 0 |
| J5 | $(J_{max} + J_{mean})/2 - J5$ |
| J6 | $J_{max} - J6$ |
| J7 | $J_{max} - J7$ |
| $J_{max}$ | 0 |

Black level expansion is analogous to white level expansion but for $J<J_{mean}$. In particular, FIG. 2D illustrates black level expansion which has a $T_{diff}$ as follows:

| point | value |
|---|---|
| $J_{min}$ | 0 |
| J1 | $J_{min} - J1$ |
| J2 | $J_{min} - J2$ |
| J3 | $(J_{min} + J_{mean})/2 - J3$ |
| $J_{mean}$ | 0 |
| J5 | 0 |
| J6 | 0 |
| J7 | 0 |
| $J_{max}$ | 0 |

Of course, white level expansion (WLE) and black level expansion (BLE) could be applied together.

A general linear interpolation transformation does not have to conform to either the BLE or WLE configuration. In fact, it is very useful to keep the shadow and highlight details as one of the parameters driving the computation. Performing full BLE would lose detail in the shadows. The same goes for full WLE which loses details in the highlight. Thus the preferred embodiments address this issue by preventing noticeable loss of detail in the dark shadows and in the highlight area.

This is accomplished by using the statistics from the pixel distribution at each end point ($J_{min}$ and $J_{max}$) of the lightness transfer function in determining how much compression of the output pixel domain to the first non-end point J1 on the transfer characteristics, as well as the last non-end point, J7. It is not necessary to have compression at points J1 and J7; however, it is much more subjectively preferable for a more enhanced image and better video viewing experience.

6. Local Dynamic Contrast Enhancement

Figure 1D:
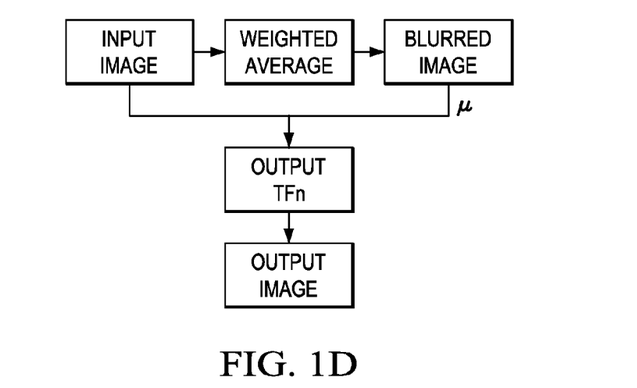
Figure 1E:
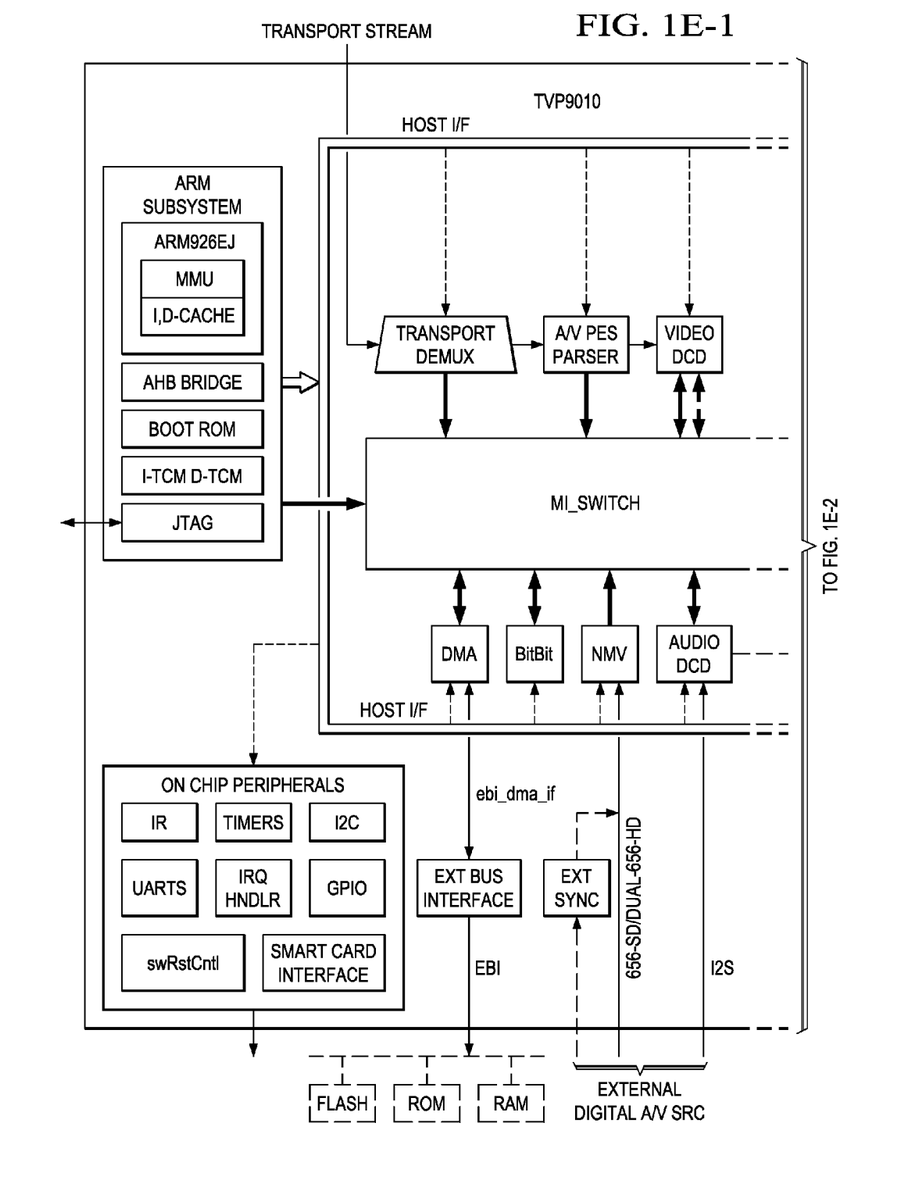
Figure 1E:
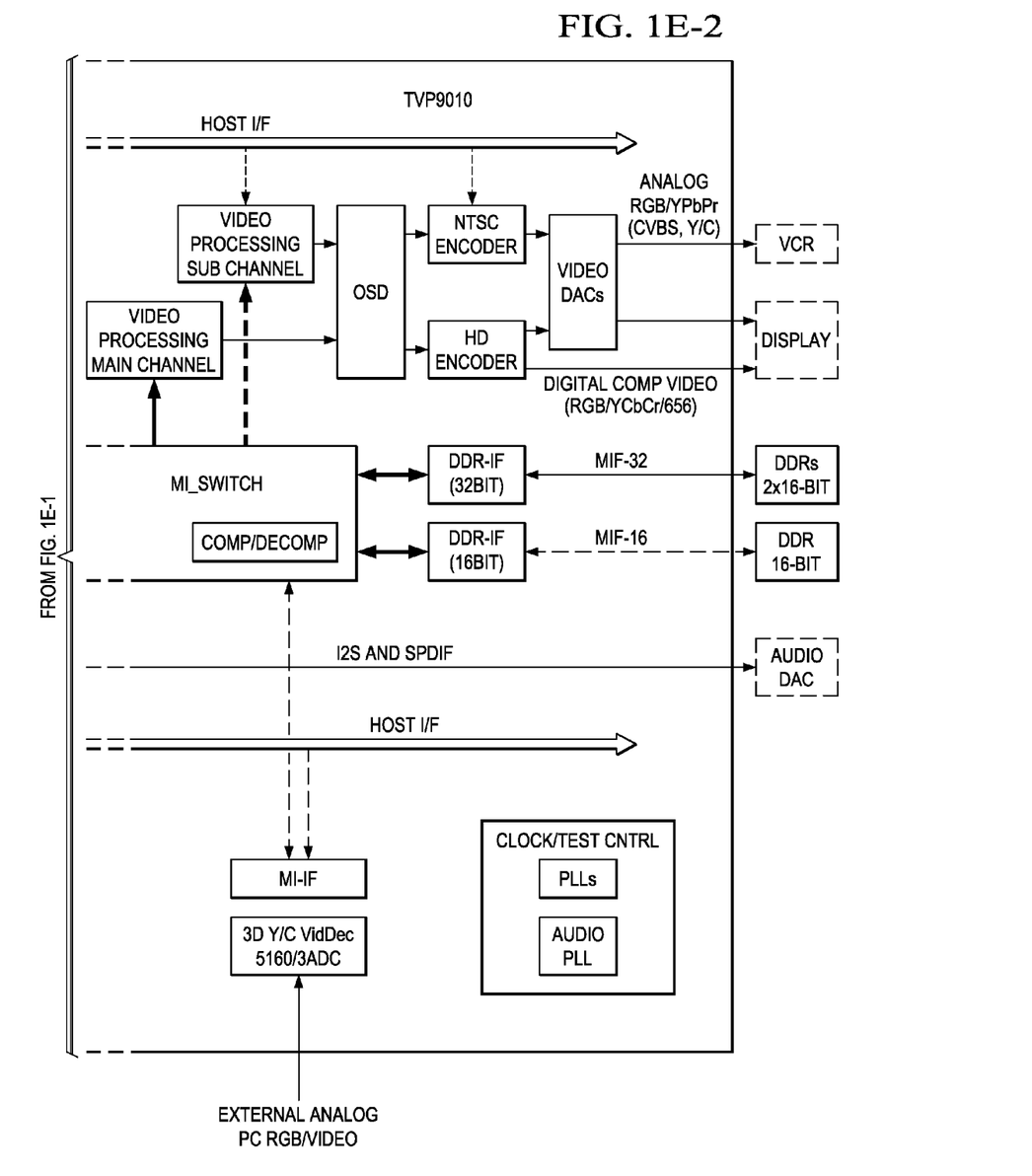

Preferred embodiment local dynamic contrast enhancement provides a separate local contrast enhancement adapted to the local conditions at a pixel. Local contrast enhancement attempts to increase the ratio of the locally-computed lightness channel variance divided by the locally-computed lightness channel mean at each pixel. Such local contrast enhancement gives better visibility and effect for contrast enhancement based on the local information at the pixel neighborhood. FIGS. 1C-1D illustrate the functional blocks with input as the global contrast enhanced images from sections 4-5.

First compute lightness channel local mean at a pixel by filtering (decimation or blurring) the image. A preferred embodiment uses a weighted average over a window, which results in a blurred version of the input image:

$$J_{local}(m, n) = (1/A) \sum_{-Wx \leq j \leq Wx} \sum_{-Wy \leq k \leq Wy} w(j, k) J(m+j, n+k)$$

where A is normalization factor for the weights w(j,k). The window could be 5×5, 7×7, etc., and the weights could be uniform over the window or peak at the window center, and could omit the center target (m,n) pixel.

The local contrast enhancement attempts to enhance the value of the local contrast at (m,n), LC(m,n), on a pixel-by-pixel basis. The local contrast can be specified as a measure of the distance between J(m,n) and $J_{local}$(m,n), such as:

$$LC(m,n) = |J(m,n) - J_{local}(m,n)| / (J(m,n) + J_{local}(m,n))$$

Because J and $J_{local}$ are non-negative, 0≤LC(m,n)≤1.

A simpler measure is:

$$LC(m,n) = \min\{|J(m,n) - J_{local}(m,n)| / J_{local}(m,n), 1\}$$

with the min{ } ensuring 0≤LC(m,n)≤1.

For each (m,n) the computed value of LC(m,n) is adaptively transformed to $LC_{out}$(m,n) as follows. To increase the local contrast of the image, we need $LC_{out}$(m,n)>LC(m,n), which can be accomplished with any of a variety of transformations, such as a power function or any function LC(m,n) defined in the range 0≤LC(m,n)≤1 for which LC(m,n)≤$LC_{out}$(m,n) applies throughout the range. As examples, $LC_{out}$=(LC)$^{1/2}$ and $LC_{out}$=log(1+LC)/log 2.

As an option, the opposite characteristics in the range 0≤LC(m,n)≤1 can be used to reduce the local contrast (i.e., $LC_{out}$<LC) if desired, and this feature may be added to preferred embodiment devices because it can use the same hardware with minimal additional hardware cost.

Lastly, the local-contrast-enhanced lightness is then computed as:

$$J_{out}(m,n) = J_{local}(m,n)[1 - LC_{out}(m,n)] / [1 + LC_{out}(m,n)]$$
when J(m,n)≤$J_{local}$(m,n)

$$J_{out}(m,n) = J_{local}(m,n)[1 + LC_{out}(m,n)] / [1 - LC_{out}(m,n)]$$
when J(m,n)≥$J_{local}$(m,n)

An alternative preferred embodiment local contrast enhancement method is to use a power function similar to localized gamma correction and in this case the output lightness would be related to the input pixel lightness as:

$$J_{out}(m,n) = J(m,n)^{Fn(LC, J_{local})}$$

where Fn(LC, $J_{local}$) is defined so that LC≤$LC_{out}$ is achieved.

Figure 5:
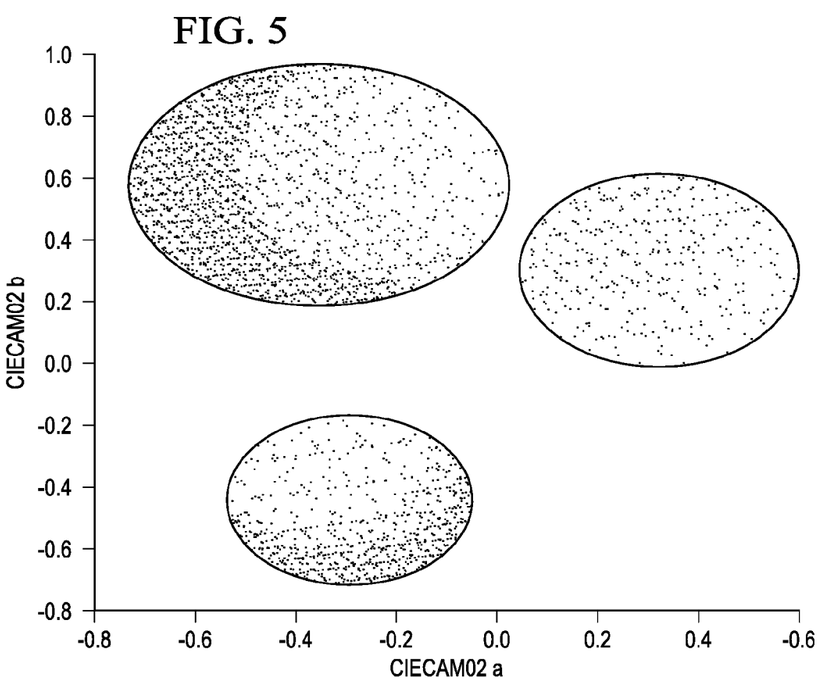
FIG. 5 shows special color coordinates.

Also as indicated in FIG. 1C, various special colors (e.g., grass, sky, skin tones) can be detected (probability computed) using the h(m,n) and s(m,n) values and corrected using stored values (i.e., "memory colors"); FIG. 5 illustrates the general locations these special colors in terms of the chroma Cartesian coordinates: $a_C$=C cos(h) and $b_C$=C sin(h). Skin tones are in the upper right, grass in the upper left, and sky in the low left of FIG. 5.

7. Skin Tone Probability

The preferred embodiments model skin tone (skin color) of people from various races and under different illuminations in video frames by chrominance clusters in the CIECAM02 color space, and the model can be a multivariate Gaussian Mixture color model. By measuring the probability of a given pixel being a skin pixel, that is, if it belong to a skin cluster, we identify skin and non-skin colors.

Due to the variation of the CIECAM02 J channel value across human face or skin, partly because of shadowing and/or lighting effects and partly because of interference by various skin related colors such as skin-similar colored features like hair, facial hair, makeup, etc., we need to discount the illuminant and the J channel information. It is not reliable to separate pixels into skin and non-skin pixels based on information from the J channel, and the probability is thus computed assuming a dimensionality of two, namely the hue and saturation channels of the CIECAM02 color space. The rational is the known fact that skin information of different people and races differ much less in color compared to differences in luminance, that is skin colors of different people are more clustered in color space than the J channel value of the skin might indicate.

To account for this, one approach is to model the skin using only color information rather than color plus luminance information in the CIECAM02 color space. This would help reduce the complexity of the classification and probability estimates without significant loss of generality. Another approach is to model the skin pixels with k-means clusters for k-levels of pixel J channel values, where a practical number of levels could be 3 or more levels, to account for shadow, highlight and mid-tone luminance ranges. The k-means clustering algorithm can be described as: given a set of pixels; we split them into k-clusters. Each cluster has a mean (h-s vector) value: $\mu_1, \mu_2, \ldots, \mu_k$. A pixel with hue-saturation values equal to (vector) x is assigned to the m-th cluster when the value of $\|x - \mu_m\|$ is the smallest for the $\mu_1, \mu_2, \ldots, \mu_k$. The distance could be a Euclidean distance or Mahalanobis distance. To determine the cluster means, an initial estimate and initial (random) cluster assignment, the cluster means and variances are then recomputed and an iterative assignment-mean recomputed sequence is repeated till convergence is achieved.

More importantly, chromatic adaptation performed during the forward CIECAM02 transformation is utilized to map the video frame information into the CIECAM02 color space while discounting the illuminant.

This is accomplished by the implicit mapping of the RGB input video frame information to the CIE XYZ domain while adapting the white point from the source into the equal energy point E (X=100,Y=100,Z=100), before finally computing the CIECAM02 lightness J, hue H, and saturation S values. The illuminant has strong effect on the concentration of the skin color besides the actual chromatic concentration of hemoglobin and melanin. This transformation with discounting of the illuminant is used in our real-time video processing. As the real-time video processing uses the equal energy illuminant E in all processing performed in the CIECAM02 color space, this would simplify the task of skin pixel classification and probability estimation in the CIECAM02 color space.

This step of discounting the illuminant helps achieve more reliable skin probability detection in the CIECAM02 color space by discounting the cluster-weakening effect introduced by the illuminant. If the effect of the illuminant is not discounted, skin color would change not only in the CIECAM02 lightness channel values (J-channel values), but also in the chrominance component as well. A high color temperature white point (correlated color temperature larger than 10,000 Kelvins) would skew the skin chrominance more towards the blue color; on the other hand, a D55 (correlated color temperature of 5500 Kelvins) would skew the skin color more towards the yellow color. The same skin tone pixels would be clustered into widely different chrominance values under these two illuminants (D55 vs. 10,000 Kelvins); on the other hand they would be clustered much closer under the same illuminant E.

Preferred embodiment methods provide statistical models for skin tones in an image as a probability density function of the hue (h) and saturation (s) values of a pixel in the CIECAM02 representation. In CIECAM02, and with an equal energy illuminant E, the conditional probability for a video frame pixel to be a skin color pixel is modeled as a mixture of multiple probabilities. Each component is assumed to be a Gaussian with its own mean and 2×2 covariance matrix. The mixture parameters would decide the contribution of each component to the skin probability. That is, let $p(x)$ denote the skin tone probability density function (pdf) where x is the 2-vector of observed hue and saturation values; then the preferred embodiment model for $p(x)$ is:

$$p(x) = \sum_{1 \leq i \leq g} \pi_i G(x, \mu_i, M_i)$$

where each component Gaussian has the form:

$$G(x,\mu,M) = \exp[-\tfrac{1}{2}(x-\mu)^T M^{-1}(x-\mu)]/[(2\pi)^2 \det(M)]^{1/2}$$

That is, we assume that the image is made of g segments; and a pixel is part of the i-th segment with probability $$\pi_i \left( \sum_{1 \leq i \leq g} \pi_i = 1 \right)$$

with skin tone in the i-th segment having h–s values close to $\mu_i$.

Several techniques can be used for the clustering of the pixel color data, such as vector quantization and k-means clustering. To determine the parameters of the multivariate Gaussian mixture model from a set of training data (i.e., the $\mu_i$ and $M_i$), the Estimation-Maximization or E-M algorithm can be used. The Expectation-Maximization method provides an effective maximum likelihood classifier for fitting the data into the Gaussian mixture model. If the number of training samples is small the E-M algorithm performs data clustering in the data space. If the number of training samples as well as the structure, such as the number of components g in the multivariate Gaussian model is known in advance, the E-M algorithm could converge to the almost-true model parameters. Training data using manually labeled skin-pixels in hundreds of images are used, and can be considered as ground truth. This manually labeled ground truth was used for training multivariate Gaussian mixture model with g=2 as well as with g=4. The E-M algorithm builds the components of the Gaussian mixture model, and good matching has been observed between the trained model and the ground truth data.

Figure 3:
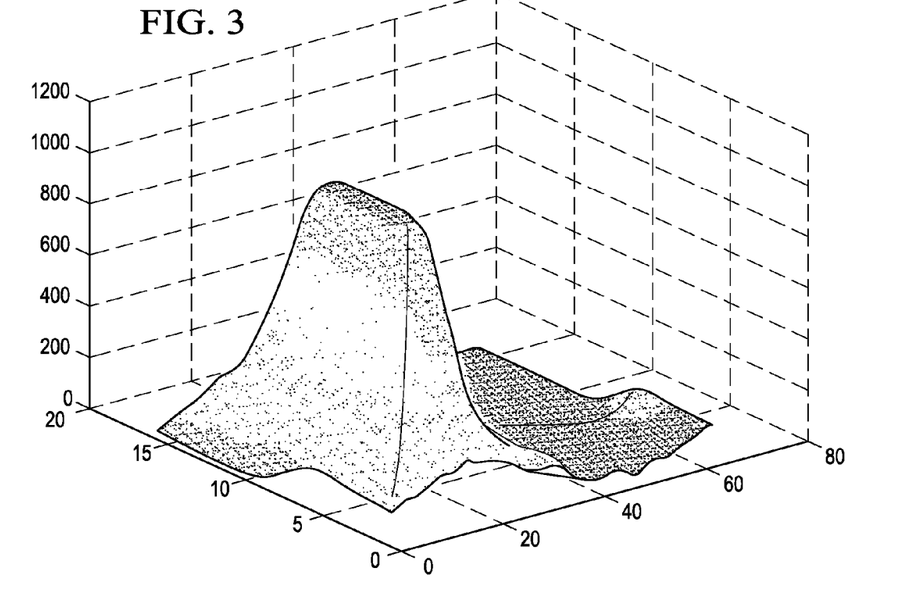
FIG. 3 is a graph of skin-tone distribution.

FIG. 3 shows a smoothed skin tone probability distribution as a function of hue and saturation; note that the distribution maximum values are roughly at h=30 degrees and with s ranging from about 10 to 20. This distribution could be modeled as a pdf, p(h,s), which is a mixture of 3 gaussians with means roughly at (30, 10), (30, 15), and (30, 20), with diagonal covariance matrices having both h and s standard deviations of roughly 10, and with equal mixture probabilities $\pi_i = \tfrac{1}{3}$. And a pixel with hue h and saturation s could be classified as a skin tone pixel (in a skin region) if p(h,s) is greater than a threshold; or a soft decision classification could depend upon neighboring pixel classifications. As noted previously, when a pixel is determined to have a skin tone color (in a region of skin), then the global contrast enhancement would skip the pixel (and the region) to preserve the original skin tone.

Furthermore, the skin tone models together with a programmable hue correction curve (see FIG. 4) provide accurate skin tone correction. That is, if a pixel has h,s values with p(h,s) greater than a threshold, then apply a hue correction which converges h values towards a typical skin tone value like 30 degrees. The correction curve of FIG. 4 is piecewise linear with the input h values as the horizontal variable and the output (corrected) h values as the vertical variable.

Figure 4:
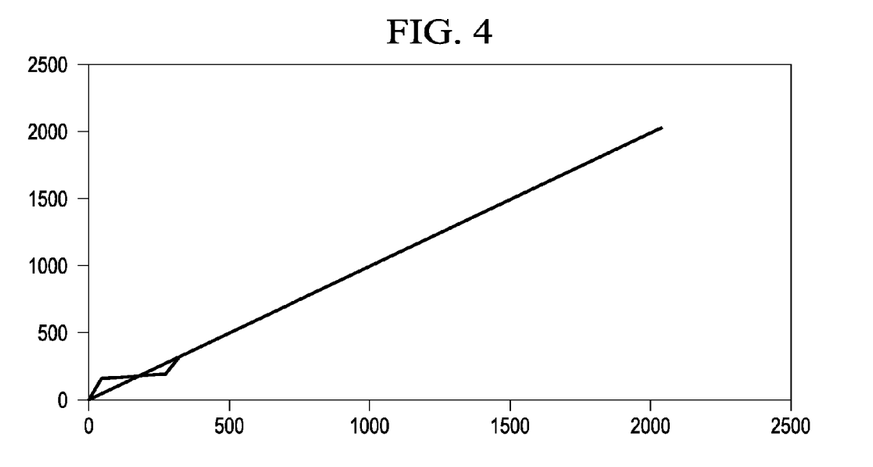
FIG. 4 is a hue correction curve.

Note that FIG. 4 has the h value (degrees) expressed in 13-bit fixed point with 11-bit integer part (i.e., the range is 0 to 2047.75) and 2 fraction bits; that is, 360 degrees equals 2048 in the units on the coordinate axes of FIG. 4. The linear segment endpoints of the correction curve are programmable; of course, the curve be a non-linear as described in the global contrast enhancement. For the FIG. 4 curve, the linear segment endpoints are (in 11-bit integer) about $h_{in}=0$, $h_{in}=50$, $h_{in}=300$, and $h_{in}=350$; and the correction curve is roughly as follows. If $0 < h_{in} < 50$, then $h_{out}=3h_{in}$; if $50 < h_{in} < 300$, then $h_{out}=150+(h_{in}-50)/50)/5$; and if $300 < h_{in} < 350$, then $h_{out}=350-3(350-h_{in})$. Thus the hue correction curve makes changes only in the range 0 to 350 which corresponds to h being in the range of about 0 to 60 degrees; and the correction curve converges values in the range towards 175, or h about 30 degrees.

This also allows for total programmability because the CIECAM02 model can adjust to viewing conditions, such as the average surround (dark, dim, average viewing room), or the color temperature (warm, neutral, or cool). That is, viewing conditions are programmed.

8. Experimental Results

Figure 6:
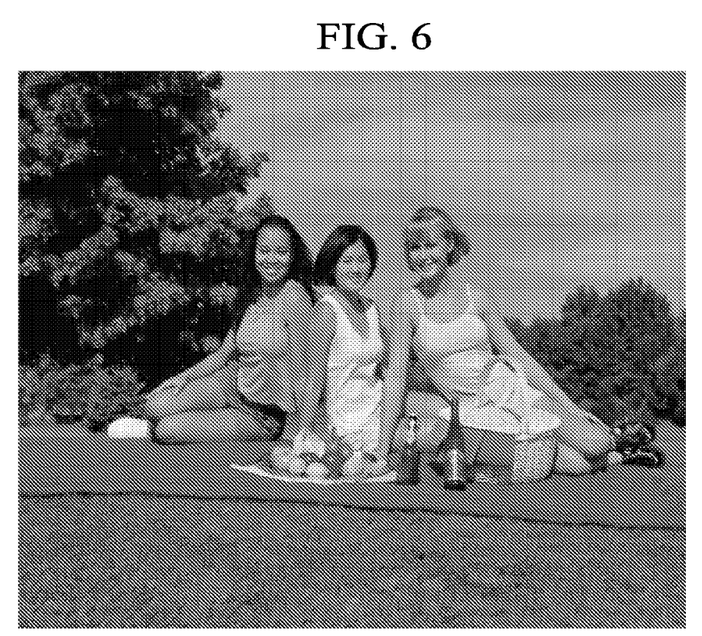
FIG. 6 is an experimental image.
Figure 7A:
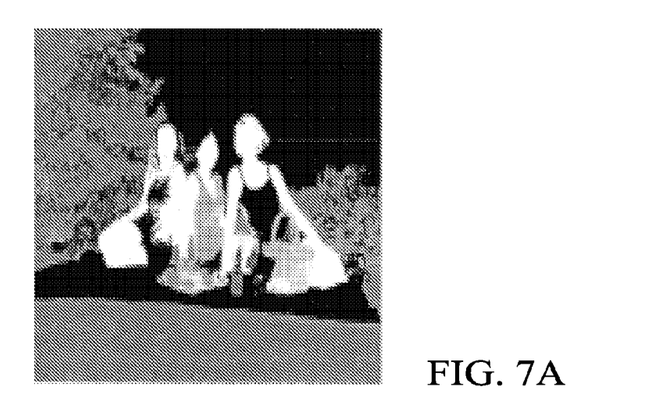
FIGS. 7A-7C illustrate experimental probabilities.
Figure 7B:
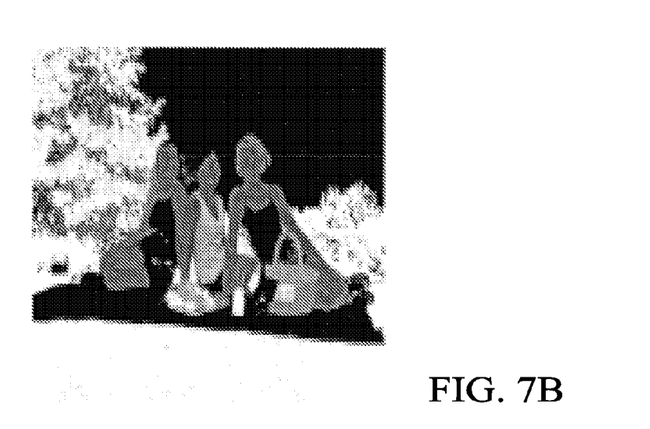
Figure 7C:
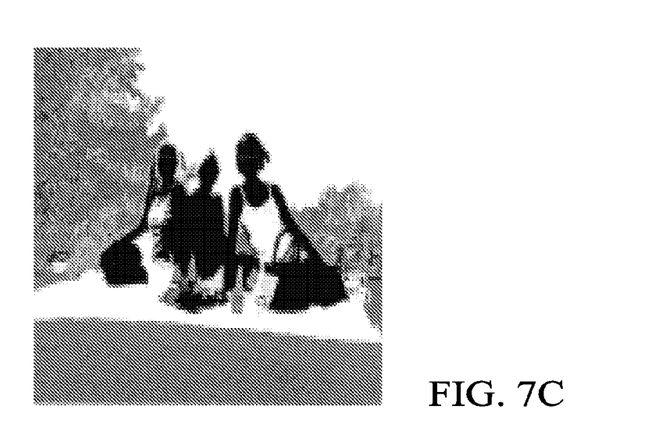

FIGS. 6, 7A-7C show an example of preferred embodiment skin tone detection. In particular, FIG. 6 is a color image, and FIGS. 7A-7C are corresponding gray scale versions of FIG. 6 showing the computed probability of a pixel being skin tone, grass, or sky, respectively, with white representing probability=1 and black representing probability=0. The probability models for grass and sky are derived analogously to the previously-described skin tone probability model.

The invention claimed is:

1. A color video local contrast enhancement method of a processor, comprising the steps of:
   (a) receiving via said processor a frame of an input color video sequence with pixel color values in the CIECAM02 color space of J, h, and s values;
   (b) for a pixel of said frame, computing a local contrast from J values of pixels in a window about said pixel for finding the absolute value of said J value for said pixel minus a weighted average of said J values of pixels in said window;
   (c) transforming said local contrast for said pixel to an enhanced local contrast for said pixel; and
   (d) computing an enhanced J value for said pixel using said enhanced local contrast for said pixel together with said J values of pixels in said window about said pixel.

2. The method of claim 1, wherein said local contrast and said enhanced local contrast are both confined to the range of values from 0 to 1, and said step (d) computing an enhanced J value includes multiplication of a weighted average of said J values of pixels in said window by the factor $(1+x)/(1-x)$ where x is either said enhanced local contrast or the negative of said enhanced local contrast.

3. A color video local contrast enhancer, comprising:
  (a) an input for receiving a frame of a color video sequence with pixel color values in the CIECAM02 color space of J, h, and s values;
  (b) a local contrast transformer coupled to said input and operable to transform said J values of said pixels to locally-contrast-enhanced J values from:
    (i) a local contrast for a pixel computed from J values of pixels in a window about said pixel;
    (ii) an enhanced local contrast for said pixel computed from said local contrast for said pixel; and
    (iii) an enhanced J value for said pixel computed from said enhanced local contrast for said pixel together with said J values of pixels in said window about said pixel for finding the absolute value of said J value for said pixel minus a weighted average of said J values of pixels in said window.

* * * * *